US012240002B2

(12) United States Patent
Nishizawa

(10) Patent No.: US 12,240,002 B2
(45) Date of Patent: Mar. 4, 2025

(54) CENTRIFUGE OF COUNTING AND DISPLAYING THE COUNTED TIME

(71) Applicant: Eppendorf Himac Technologies Co., Ltd., Ibaraki (JP)

(72) Inventor: Gen Nishizawa, Ibaraki (JP)

(73) Assignee: Eppendorf Himac Technologies Co., Ltd., Ibaraki (JP)

( * ) Notice: Subject to any disclaimer, the term of this patent is extended or adjusted under 35 U.S.C. 154(b) by 752 days.

(21) Appl. No.: 17/434,756

(22) PCT Filed: Sep. 30, 2020

(86) PCT No.: PCT/JP2020/037349

§ 371 (c)(1),
(2) Date: Aug. 29, 2021

(87) PCT Pub. No.: WO2021/131216

PCT Pub. Date: Jul. 1, 2021

(65) Prior Publication Data

US 2022/0161278 A1 May 26, 2022

(30) Foreign Application Priority Data

Dec. 27, 2019 (JP) ................................ 2019-238146

(51) Int. Cl.
*B04B 13/00* (2006.01)
*B04B 15/02* (2006.01)

(52) U.S. Cl.
CPC .............. *B04B 13/00* (2013.01); *B04B 15/02* (2013.01)

(58) Field of Classification Search
CPC ................................ B04B 13/00; B04B 15/02
See application file for complete search history.

(56) References Cited

U.S. PATENT DOCUMENTS 5,871,435 A 2/1999 Numata et al.

FOREIGN PATENT DOCUMENTS

CN 2713937 8/2005
CN 2713937 Y * 8/2005

(Continued)

OTHER PUBLICATIONS

"International Search Report (Form PCT/ISA/210) of PCT/JP2020/037349," mailed on Nov. 24, 2020, with English translation thereof, pp. 1-6.

(Continued)

*Primary Examiner* — Walter D. Griffin
*Assistant Examiner* — Shuyi S. Liu
(74) *Attorney, Agent, or Firm* — JCIPRNET

(57) ABSTRACT

Provided is a centrifuge that allows a user to easily determine whether running is normally completed or the running is not started. In the centrifuge having a setting screen 70A on which input of centrifugal running conditions and a centrifugal running state can be displayed, a control device performs centrifugal separation running of a rotor according to a set running time, a set rotation speed, and a set temperature. When the centrifugal separation running is completed and the rotor is stopped, the control device arranges an elapsed time display column 71 in a setting screen 70A, counts the time since the motor is stopped, and displays an elapsed time 73 after the centrifugal separation running is completed.

14 Claims, 8 Drawing Sheets

(56) References Cited

FOREIGN PATENT DOCUMENTS

| | | | | | |
|---|---|---|---|---|---|
| CN | 1931441 | | | 3/2007 | |
| CN | 201191441 | | | 2/2009 | |
| CN | 104741251 | | | 7/2015 | |
| CN | 106774206 | | | 5/2017 | |
| CN | 107274154 | | | 10/2017 | |
| CN | 207457733 | | | 6/2018 | |
| JP | H06229561 | | | 8/1994 | |
| JP | H0771769 | | | 3/1995 | |
| JP | H0771769 | A | * | 3/1995 | |
| JP | 2000301029 | | | 10/2000 | |
| JP | 2003093230 | | | 4/2003 | |
| JP | 2007075726 | | | 3/2007 | |
| JP | 2008093588 | | | 4/2008 | |
| JP | 2008100140 | | | 5/2008 | |
| JP | 2008100140 | A | * | 5/2008 | |
| JP | 2009082836 | | | 4/2009 | |
| JP | 2010131585 | | | 6/2010 | |
| JP | 2010131585 | A | * | 6/2010 | ............. B04B 13/00 |
| JP | 2015116541 | | | 6/2015 | |
| WO | 2017115595 | | | 7/2017 | |
| WO | WO-2017115595 | A1 | * | 7/2017 | ............. B04B 13/00 |

OTHER PUBLICATIONS

"Office Action of Japan Counterpart Application" with English translation thereof, issued on May 10, 2022, p. 1-p. 12.

"Office Action of China Counterpart Application", issued on Feb. 27, 2023, with English translation thereof, pp. 1-19.

"Decision on Rejection of China Counterpart Application", issued on Jul. 10, 2023, with English translation thereof, pp. 1-25.

Office Action of China Counterpart Application, with English translation thereof, issued on Sep. 2, 2022, pp. 1-20.

* cited by examiner

CENTRIFUGE OF COUNTING AND DISPLAYING THE COUNTED TIME

CROSS-REFERENCE TO RELATED APPLICATION

This application is a 371 application of the International PCT application serial no. PCT/JP2020/037349, filed on Sep. 30, 2020, which claims the priority benefits of Japan Patent Application No. 2019-238146, filed on Dec. 27, 2019. The entirety of each of the above-mentioned patent applications is hereby incorporated by reference herein and made a part of this specification.

BACKGROUND

Technical Field

The present invention relates to a centrifuge in which an elapsed time after centrifugal separation running is completed can be checked at a glance.

Related Art

A centrifuge (a centrifugal separator) is used by a user to set running conditions such as a rotation number, a running time (a separation time), a holding temperature, an acceleration gradient, a deceleration gradient, and the like according to a sample to be separated. Therefore, a display unit for displaying the set conditions and an actual state is arranged in the centrifuge. Conventionally, these displays are commercialized from displays using a seven-segment LED to displays using a touch type liquid crystal display, and various innovations are made in order to improve the usability of the centrifuge. For example, Patent literature 1 discloses a centrifuge which displays lots of information so that the functions of the centrifuge can be known during condition setting and during acceleration and deceleration, and displays only information necessary for centrifugal separation during rotation stabilization which generally takes a longer time than the acceleration and deceleration time and during which the user tends to move away from the centrifuge. In addition, in Patent literature 2, a program running status is displayed by a line graph on a display unit, and an estimated arrival time at which the rotation of the rotor is stopped is displayed.

LITERATURE OF RELATED ART

Patent Literature

Patent literature 1: Japanese Patent Laid-Open No. 2000-301029

Patent literature 2: Japanese Patent Laid-Open No. 2015-116541

SUMMARY

Problems to be Solved

As in Patent literature 1, during the stabilization when the user tends to move away from the centrifuge, only the information required for the centrifuge, such as a “set rotation speed”, a “set temperature”, and a “set time”, is displayed, but it is possible to check judgement on whether the user has performed an operation of starting the running during the stabilization. However, because the screen returns to the initial operation screen when the running is completed, it is not possible to judge on the screen whether the centrifugal running has been completed or whether the centrifugal running has not been executed in the first place. On the other hand, in Patent literature 2, in the line graph showing a running status, the portion where the running is completed is highlighted by hatching, an indicator which indicates a position currently in progress is displayed by an arrow, and thus the status can be easily checked. However, in order to use the technique of Patent literature 2, it is necessary to use a display having high definition. Furthermore, it is necessary to use a real-time clock (RTC) in the centrifuge to continue to record a “time point” by a battery backup and the like even if the power of the system is turned off, and an increase in manufacturing cost is inevitable for use in a centrifuge having a simple configuration.

The present invention is accomplished in view of the above-described background, and an objective thereof is to provide a centrifuge that allows a user to easily determine whether the running of the centrifuge is normally completed or the running is not started when the user moves away from the centrifuge immediately after the running of the centrifuge is started and the running is stopped when the user returns thereafter.

Another objective of the present invention is to provide a centrifuge having a function of using an incorporated timer of the centrifuge to determine an elapsed time after the running is completed at a glance without implementing a real-time clock.

Still another objective of the present invention is to provide a centrifuge that allows the user to immediately judge whether follow-up running is necessary or not even when the rotor is placed for a long time without being removed after the running is completed.

Means to Solve Problems

Typical features of the invention disclosed in the application are described as follows.

According to a feature of the present invention, a centrifuge has: a rotor; a motor which drives the rotor to rotate; an input/output part which allows a user to input a set running time of the rotor and a drive start instruction of the motor, and is capable of displaying a running state of the motor; and a control unit which controls to start drive of the motor when the drive start instruction is input to the input/output part and controls the drive of the motor. The control unit stops the motor after the elapse of the set running time for centrifugal separation which is input by the input/output part. In the centrifuge, the control unit is configured to start counting of counted time after the set running time is elapsed and display this counted time on the input/output part. In addition, the control unit either erases the display of the counted time performed by the input/output part or stops counting of the counted time when an operation of the input/output part by a user is detected during counting of the counted time. Furthermore, the rotor decelerates and stops after the running for the set running time at a constant rotation speed is completed, and the control unit starts counting of the counted time after the rotor is stopped.

According to another feature of the present invention, the input/output part is a touch-type dot matrix display, which displays a set running time and a set rotation speed of the rotor and a set temperature of the rotor (or a rotor chamber). The control unit displays the counted time by adding the counted time to the content of the display or superimposing the counted time on a screen of the display. In addition, the input/output part is a combination of a segment type display device and an operation input unit which makes the display content of the display device variable. A display column of the set running time of the rotor is arranged in the display device, and counting of the counted time after the elapse of the set running time is performed by counting up and displaying the column of the set running time in a display mode different from the usual one. Furthermore, the control unit has a storage unit, and the control unit stores an end time point at which the motor is stopped in the storage unit, and displays the end time point stored in the storage unit on the input/output part.

According to still another feature of the present invention, the centrifuge has a bowl which accommodates the rotor, and an upper opening unit of the bowl is closed by an openable door to form a rotor chamber. A cooling device which cools the bowl is arranged, and the control unit makes the cooling device work to maintain a temperature of the rotor chamber at a set temperature even in the middle of counting of the counted time and the display of the counted time on the input/output part. In addition, the centrifuge further includes a communication part capable of communicating with a mobile terminal, and the control unit transmits the counted time to an external mobile terminal via the communication part and displays the counted time on the external mobile terminal. Furthermore, the centrifuge is configured in a manner that the control unit stops the display of the counted time performed by an input/output part when the door which opens and closes the opening unit of the rotor chamber is opened.

Effect

According to the present invention, by the above-described method, the centrifuge is configured so that the end of the running can be inexpensively judged without implementing a real-time clock, and the elapsed time after the running is completed can be checked at a glance, and thus the usability of the centrifuge can be greatly improved.

DESCRIPTION OF THE EMBODIMENTS

Example 1

Figure 1:
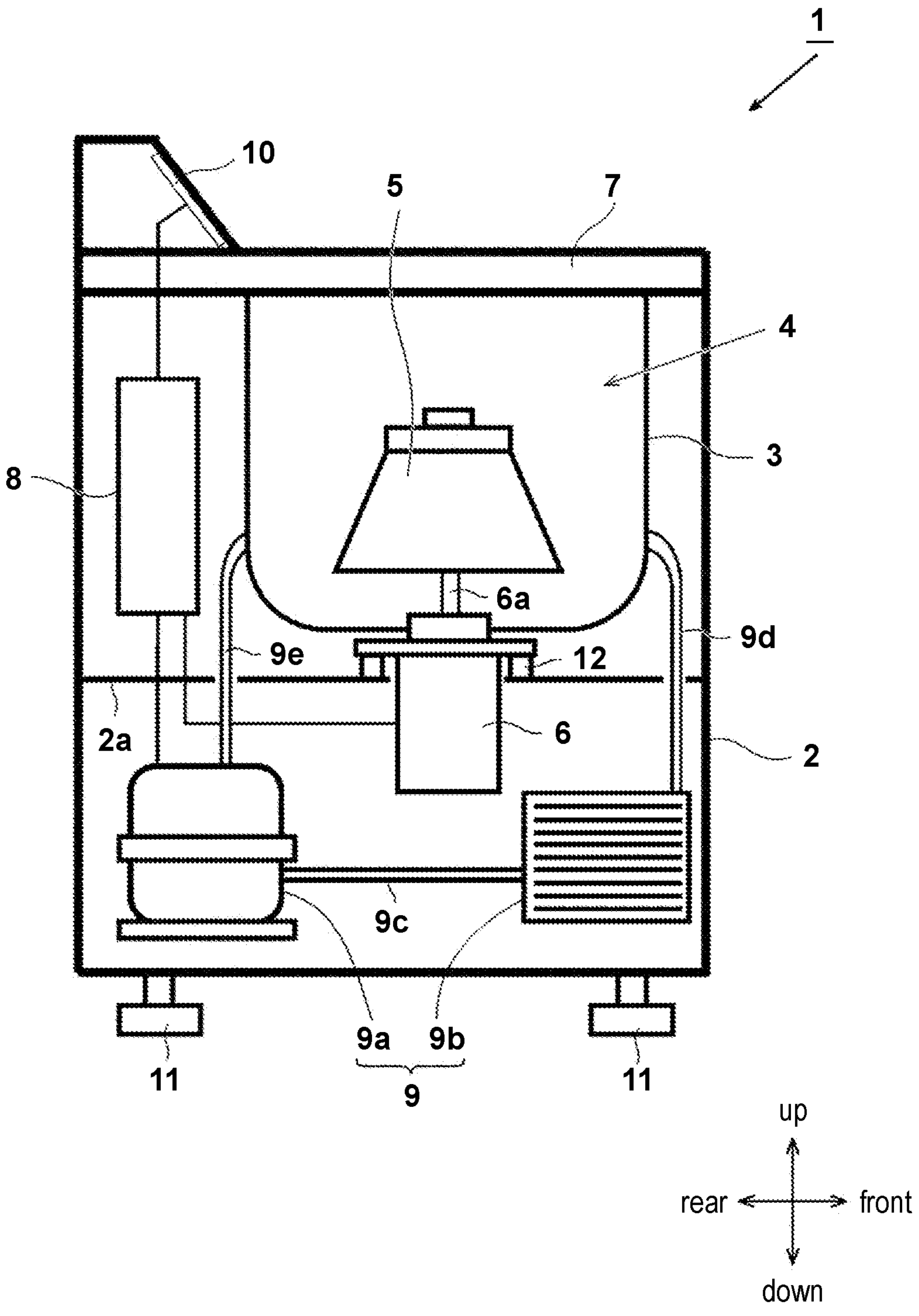
FIG. 1 is a cross-sectional view showing an overall configuration of a centrifuge 1 according to an example of the present invention.

An example of the present invention is described below based on drawings. It should be noted that in the diagrams below, the same portions are designated by the same reference numerals, and the repeated description is omitted. In addition, in the specification, front-back and up-down directions are described as directions shown in the diagrams.

FIG. 1 is a cross-sectional view showing an overall structure of a centrifuge 1 according to the example of the present invention. In the centrifuge 1, a bowl 3 formed by a thin metal plate is arranged inside a housing 2 made of a box-shaped sheet metal and the like, and a rotation chamber 4 is defined by the bowl 3 and a door 7. Leg units 11 are arranged at the bottom of the housing 2. The door 7 seals an opening unit of the rotation chamber 4, and can be revolved in an up-down direction with a hinge (not shown) arranged in a portion of the housing as a central axis. A rotor 5 holds a sample to be separated and rotates at a high speed, and is mounted on a rotation shaft 6*a* of the motor 6. The motor 6 is an alternating current motor driven using a commercial alternating current power supply, or a brushless motor of inverter control, and the motor 6 is held by a partition plate 2*a* of the housing 2 via a damper 12.

An operation panel 10 is arranged on a right side of the door 7, wherein on the operation panel 10, the user inputs conditions such as a rotation speed, a separation time, and the like of the rotor, and various information is displayed. The operation panel 10 serves as an input unit for inputting control information required for the centrifuge. In the example, by using a so-called touch panel type liquid crystal display, the operation panel 10 also functions as a display unit for displaying the required information to the operator. Moreover, the operation panel 10 may be configured by not only the touch panel type liquid crystal display but also other dot matrix type input/output devices. In addition, the operation panel 10 may also be configured by a combination of another known display device and a known input device.

The rotation chamber 4 is configured in a manner that an opening unit on an upper side can be sealed by the door 7, and the rotor 5 can be mounted or removed inside the rotation chamber 4 in a state that the door 7 is opened. The rotor 5 is appropriately selected according to a sample to be centrifugally separated and a sample container for holding the sample, and is mounted on the rotation shaft 6*a* of the motor 6. A control device 8 controls the entire centrifuge 1, and performs rotation control of the motor 6, running control of a cooling device 9, and the like according to various information for the centrifugal separation running, which is input from the operation panel 10.

The temperature of the rotor 5 is measured by a temperature sensor (not shown) set in the rotation chamber 4. It is conceivable that the temperature sensor is arranged at various positions, but in the example, the temperature sensor is arranged at the bottom of the bowl 3. Output of the temperature sensor is monitored by the control device 8, and the control device 8 makes the cooling device 9 work to keep the temperature of the rotation chamber 4 at the set temperature input by the user.

The bowl 3 is made of a metal alloy such as stainless steel or the like, and a copper pipe (not shown) is spirally wound around the outer periphery of the bowl 3. The copper pipe configures a portion of the cooling device 9, a refrigerant is sent from a compression machine 9*a* included in the cooling device 9 to a condensation machine 9*b* through a copper pipe 9*c*, and the cooled refrigerant is liquefied by the condensation machine 9*b* and a fan (not shown). The liquefied refrigerant is supplied to a copper pipe 9*d* through a capillary (not shown), and cools the inside of the rotation chamber 4 by rapidly taking the heat of a surface of the bowl 3 away in the portion wound around the outer periphery portion of the bowl 3. The refrigerant vaporized by taking the heat of the bowl 3 away returns to the compression machine 9*a* through a copper pipe 9*e*. In this way, the inside of the rotation chamber 4 is kept constant at a desired temperature set by the control of the control device 8 to the cooling device 9.

Figure 2:
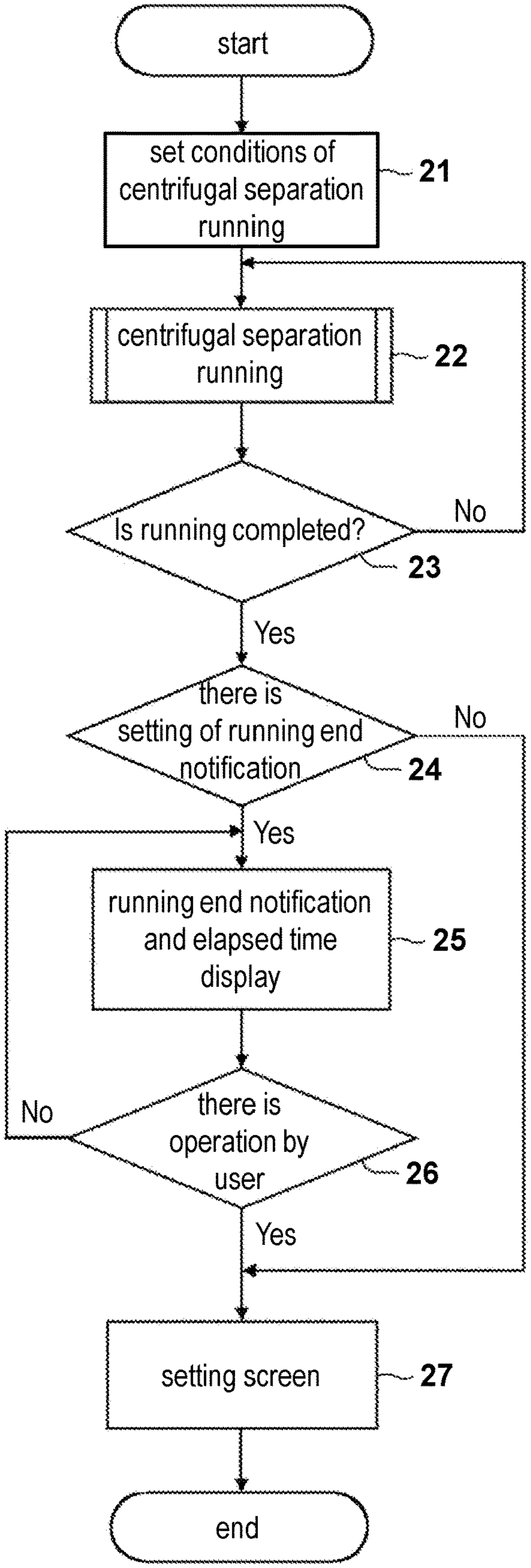
FIG. 2 is a flow chart showing control procedures of the centrifuge 1 according to the example of the present invention.

FIG. 2 is a flow chart showing control procedures of the centrifuge 1 of the example. The series of procedures shown in FIG. 2 can be executed software-wise by a program stored in the control device 8 in advance. First, the user sets the rotor 5, in which an object to be centrifugally separated is accommodated, inside the rotation chamber 4, closes the door 7, and inputs various information for the centrifugal separation running from the operation panel 10 (Step 21). The various information includes a set rotation speed, a set temperature, a running time, an acceleration speed, a deceleration speed, and the like of the rotor 5. The centrifuge 1 shown in FIG. 1 does not have a vacuum device, but in a case of a centrifuge having a vacuum device, a vacuum degree in the rotation chamber 4 is set. Here, a setting screen 50 of the various information for the centrifugal separation running, which is displayed on the operation panel 10, is described with reference to FIG. 3.

Figure 3:
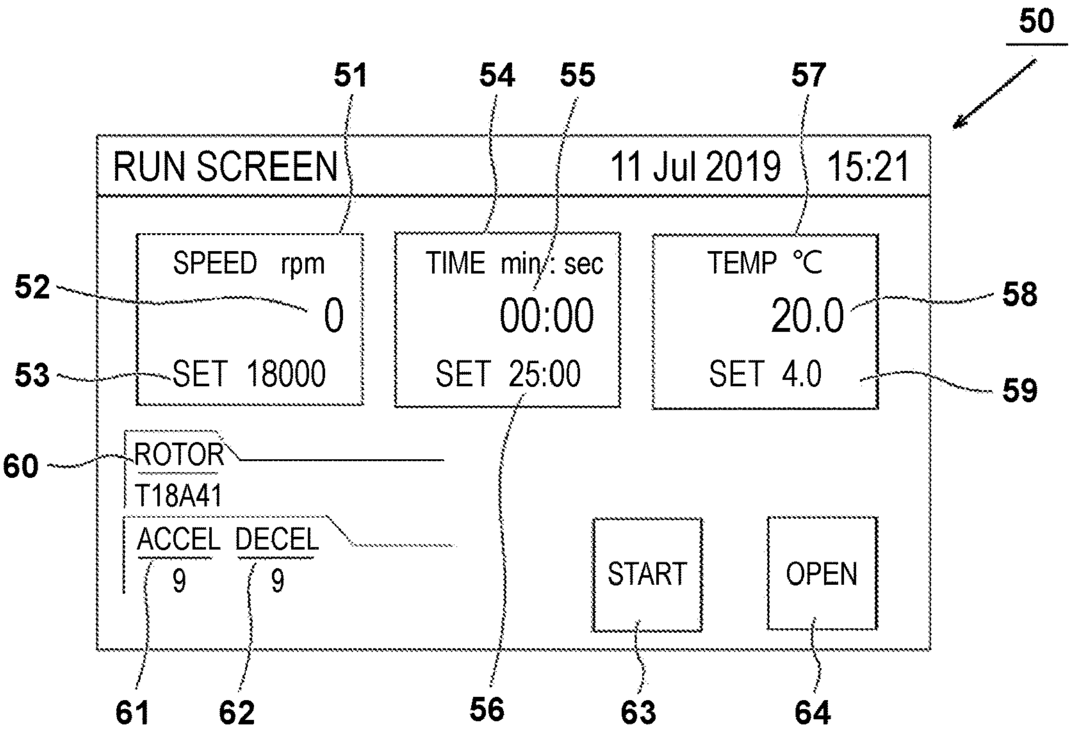
FIG. 3 is a diagram showing a setting screen 50 of an operation panel 10 according to the example of the present invention.

FIG. 3 is a diagram showing the setting screen 50 on the operation panel 10 in Step 21. This display screen is in a state immediately after the running conditions of the centrifuge 1 are set (before a start button is pressed). The setting screen 50 displays the running state and the running conditions (set values) of the centrifuge 1, and a rotation speed display region 51, a running time display region 54, and a temperature display region 57 which are the running conditions of the centrifuge are arranged in the screen. Around these regions, a rotor type display unit 60 that indicates a type of the rotor 5 set in the rotation chamber 4, an ACCEL display unit 61 that indicates an acceleration degree of the rotor 5, and a DECEL display unit 62 that indicates a deceleration degree of the rotor 5 are arranged. A start button 63 that is displayed as an icon to instruct the start of the centrifugal separation action, and an open button 64 for opening the door 7 are displayed in a lower right portion of the setting screen 50.

The rotation speed display region 51 displays information related to the rotation speed of the rotor 5, a large number "0" in the center indicates a current rotation speed 52 of the rotor 5, and a number following "SET" on a lower side of the current rotation speed 52 is a set rotation speed 53 which is set (SET). In the example of FIG. 3, 18,000 rotations per minute (rpm) is set as the set rotation speed 53 for performing the centrifugal separation. When the user touches the inside of the frame of the rotation speed display region 51 with a finger, a numeric keypad screen (not shown) is displayed in a pop-up manner, and thus the user can set the set rotation speed 53 by operating the numeric keypad.

The running time display region 54 displays information related to the running time of the rotor 5, and a large number in the center is an actual running time (an elapsed time) 55 during which the rotor 5 is run at the set rotation speed 53, and is displayed in units of minute and second. In FIG. 3, because this is a state before the centrifugal separation is performed and the rotor 5 still does not rotate, the running time 55 is displayed as 00 minutes and 00 seconds. The running time 55 is automatically counted and displayed using a timer function included in a microcomputer of the control device 8. A number following "SET" on a lower side of the running time 55 is a set running time 56 which is the time for performing the centrifugal separation input by the user. In the example of FIG. 3, a state is shown in which 25 minutes and 00 seconds is set as the time for performing the centrifugal separation. Similar to the rotation speed display region 51, when the user touches the inside of the frame of the running time display region 54 with a finger, a numeric keypad screen (not shown) is displayed in a pop-up manner, and the user can set the running time by operating the numeric keypad.

The temperature display region 57 displays information related to the temperature inside the rotation chamber 4, a large number in the center is a current temperature 58 of the rotation chamber 4, and a number following "SET" on a lower side of the current temperature 58 is a set temperature 59 of the rotor 5 that should be held when the centrifugal separation is performed. FIG. 3 shows that the current temperature 58 is 20.0° C., and the set temperature that is set is 4.0° C. Similar to the rotation speed display region 51, when the user touches the inside of the frame of the temperature display region 57 with a finger, a numeric keypad screen (not shown) is displayed in a pop-up manner, and the user can set the set temperature by operating the numeric keypad.

The rotor type display unit 60 is a display of a model name of the rotor 5 to run, and in FIG. 3, "TA18A41" which is a model number of the rotor 5 is displayed. The setting of the rotor 5 may be configured in a manner that the user touches the portion of the rotor type display unit 60 to display a rotor list screen (not shown), and selects a rotor from the list, or may be performed in a manner that the rotor 5 itself has the information and the rotor model number is automatically identified on the centrifuge 1 side when the rotor 5 is set in the centrifuge 1. Regarding a method of automatically identifying the rotor model number, an optical or magnetic ID code may be attached to the rotor, and other known identification methods may also be used, and thus the description thereof is omitted.

The start button 63 is a button for starting the running of the centrifuge 1, and when the start button 63 is touched, the control device 8 accelerates the rotor 5 to the set rotation speed 53 set in the rotation speed display region 51, and rotates (stabilizes) the rotor 5 at the set rotation speed 53. The open button 64 is a button for opening the door 7 of the centrifuge 1, and when the open button 64 is touched, a lock mechanism (not shown) of the door 7 is released.

Return to FIG. 2 again. When the input of the various information for the centrifugal separation running is completed in Step 21, the user starts the centrifugal separation running by operating the start button 63 (see FIG. 3) from the operation panel 10 (Step 22). The procedures of the centrifugal separation running include, for example, acceleration, stabilization, and deceleration of the rotor 5, and the running control procedures are the same as those of a conventional centrifuge. The control device 8 proceeds to Step 24 when the centrifugal separation running is completed, and returns to Step 22 when the centrifugal separation running is not completed (Step 23). Here, FIG. 4 shows a display screen 50A displayed on the operation panel 10 when the centrifugal separation running is completed and the rotor 5 is decelerating.

Figure 4:
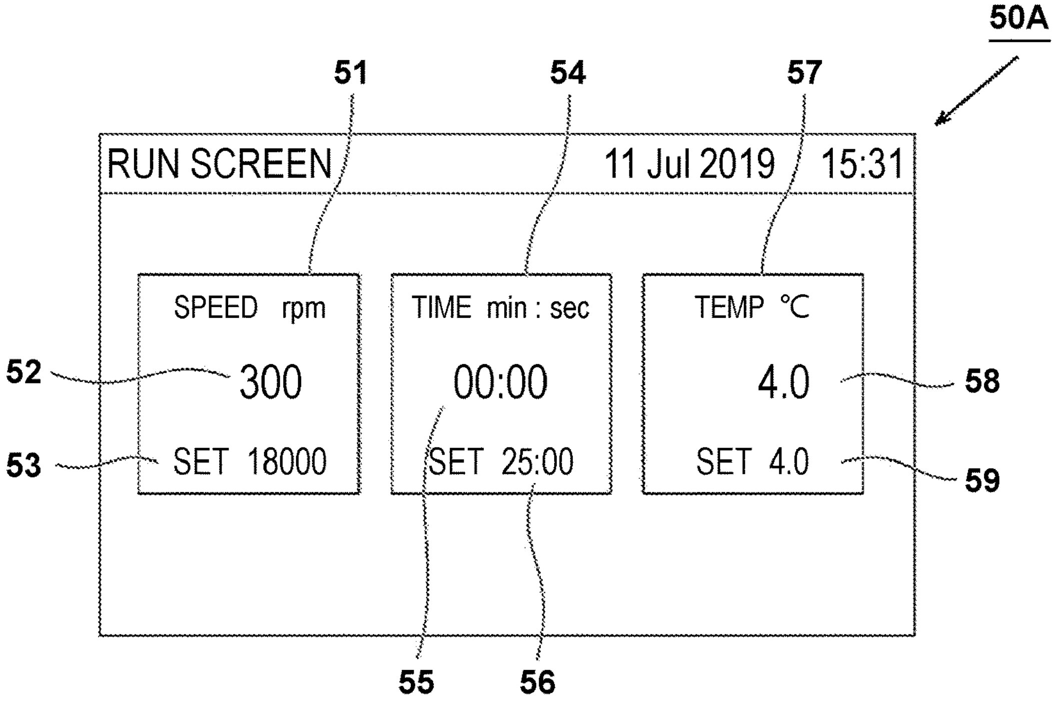
FIG. 4 is a diagram showing a display screen 50A of the operation panel 10 according to the example of the present invention.

In FIG. 4, only the required information in the setting screen 50 shown in FIG. 3 is displayed, that is, only three display regions including the rotation speed display region 51, the running time display region 54, and the temperature display region 57 are displayed. Because the rotor 5 is in the middle of decelerating, the start button 63 (see FIG. 3) and the open button 64 (see FIG. 3) are not displayed on the display screen 50A. Here, it is indicated that the current rotation speed 52 of the rotor 5 is decelerated to 300 rpm, and the elapsed running time 55 is displayed as 00 minutes 00 seconds. Here, the running time 55 is counted up or counted down during the centrifugal separation running, but in the state shown in FIG. 4, the centrifugal separation running is completed and the rotor 5 is decelerating from the stabilization rotation number (18,000 rpm), and thus the running time 55 reaches zero or is cleared to zero. Because the cooling device 9 continues to work even after the centrifugal separation running is completed, and the inside of the rotation chamber 4 is kept constant, the current temperature 58 of the rotation chamber 4 is 4.0° C., which is kept equal to the set temperature 59. The cooling device 9 is controlled by the control device 8 to stop after the door 7 is opened.

Return to FIG. 2 again. Step 24 and subsequent steps are controls after the centrifugal separation running is completed and the rotation of the rotor 5 is stopped. As a prerequisite for executing Steps 25 and 26 after Step 24, the centrifuge 1 of the example is configured to allow a previous setting on whether "to perform a special running end notification for the user on the operation panel 10 after the centrifugal separation running is completed" or "not to perform the running end notification". Performing this "running end notification" is a characteristic control of the example. Base on the previous setting, the control device 8 determines whether the (previous) setting of the "running end notification" is performed (Step 24). When the previous setting is made, the control device 8 performs "the display screen immediately after the running is completed", and the elapsed time after the centrifugal separation running is completed is displayed on this display screen (Step 25). When the previous setting is not made, that is, when the running end notification is not performed after the centrifugal separation running is completed, the process proceeds from Step 24 to Step 27. Here, the notification screen 70 immediately after the running is completed is described with reference to FIG. 5.

Figure 5:
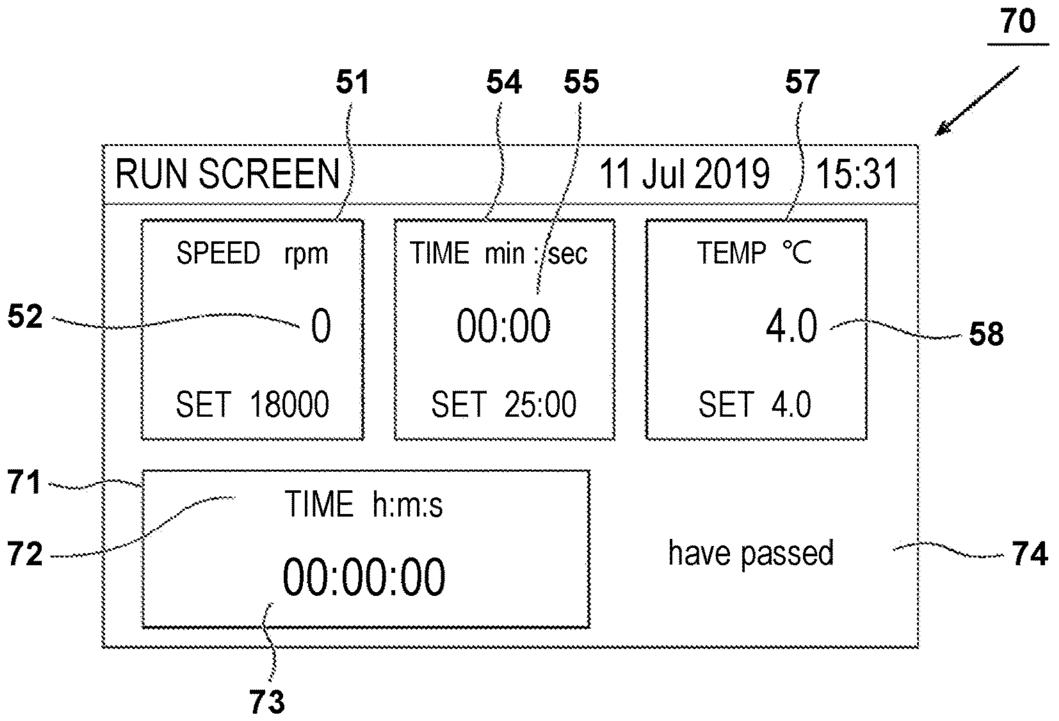
FIG. 5 is a diagram showing a notification screen 70 of the operation panel 10 according to the example of the present invention.

In FIG. 5, the notification screen 70 is obtained by adding an elapsed time display to the display screen 50A in FIG. 4, which is in a state immediately before the rotor 5 is stopped. That is, three display regions including the rotation speed display region 51, the running time display region 54, and the temperature display region 57 are moved to the upper portion of the notification screen 70, an elapsed time display column 71 is displayed on a lower side of the three display regions, and a descriptive text ("have passed") 74 indicating that the time has elapsed is displayed on a right side of the elapsed time display column 71. FIG. 5 shows a state immediately after switching from the display screen 50A in FIG. 4 to the notification screen 70 in FIG. 5, and thus an elapsed time 73 shown in the elapsed time display column 71 is displayed as "00:00:00". On an upper side of the elapsed time 73, a description ("TIME h:m:s") 72 indicating the unit of the time is displayed.

Return to FIG. 2 again. When the notification screen 70 indicating the end of the running is displayed in Step 25, the control device 8 determines whether there is some operation (input) of the operation panel 10 by the user (Step 26), and if there is no operation, the process returns to Step 25, and the elapsed time 73 (see FIG. 5) in the notification screen 70 indicating the end of the running is updated. "Some operation" is an operation with which it is possible to check that the user is in front of the centrifuge 1, and here, "some operation" refers to an operation of touching any area of the operation panel 10 by the user, for example, any one of the rotation speed display region 51, the running time display region 54, and the temperature display region 57. Here, a notification screen 70A after the update is described with reference to FIG. 6.

Figure 6:
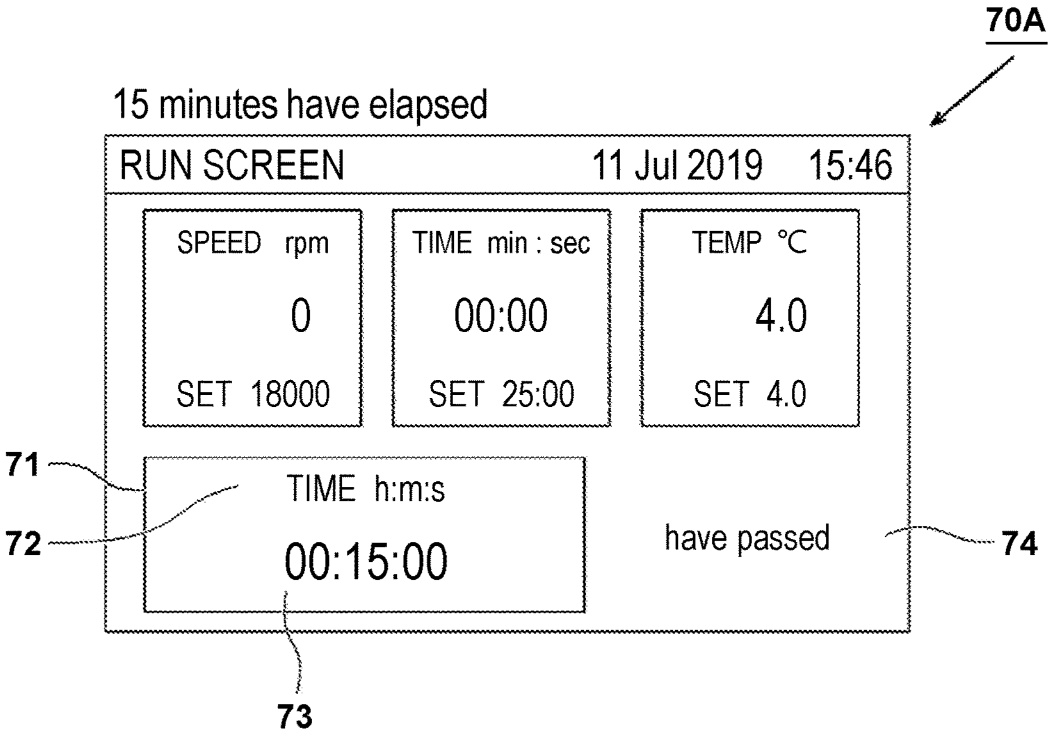
FIG. 6 is a diagram showing a notification screen 70A of the operation panel 10 according to the example of the present invention (No. 4).

The example shown in FIG. 6 shows a state in which the display in FIG. 5 is left for 15 minutes after the display in FIG. 5 is made, and no operation is performed by the user during this period. The notification screen 70A in FIG. 6 is the same as the notification screen 70 in FIG. 5 except for one point, and the difference is that the elapsed time 73 is counted up from "00:00:00" in FIG. 5 to "00:15:00" in FIG. 7. By viewing the notification screen 70A, the user can immediately determine that 15 minutes have elapsed after the centrifugal separation running is completed. It should be noted that the notification screens 70 and 70A are displayed in monochrome in FIG. 5 and FIG. 6, but when a touch-input type display device capable of color display is used as the operation panel 10, the notification screens 70 and 70A may be displayed in a mode of indicating that the centrifugal separation running has been completed by the color display. For example, when the centrifugal separation running is normally completed, the entire screen or a specific portion of the screen is displayed in blue, and when the centrifugal separation running is abnormally stopped, the entire screen or a specific portion of the screen is displayed in red. Furthermore, even in a case in which the centrifugal separation running is normally completed, the notification screens 70 and 70A may be displayed so as to change the display mode in a manner that, for example, the display color of the elapsed time display column 71 is green when the elapsed time is less than 0~10 minutes, is yellow when the elapsed time is 10~20 minutes, and is red when the elapsed time is 20 minutes or more.

Figure 7:
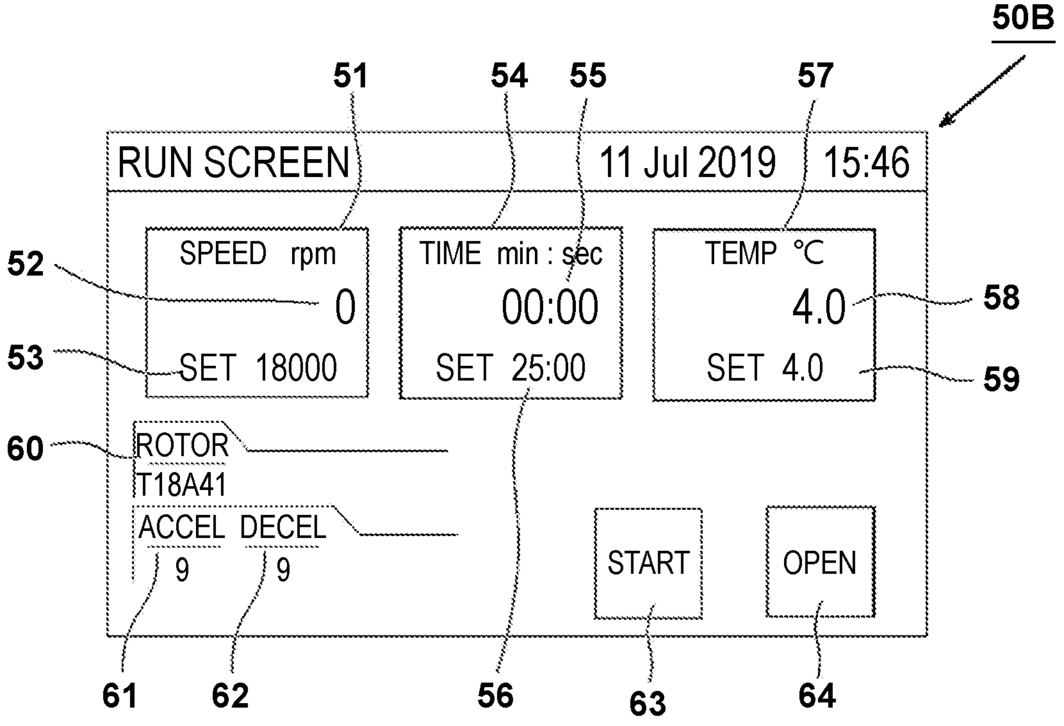
FIG. 7 is a diagram showing a setting screen 50B after the notification screen 70A of the operation panel 10 according to the example of the present invention is erased.

Return to FIG. 2 again. When there is an operation of the operation panel 10 by the user in Step 26, the control device 8 ends the control of the example by returning the display of the operation panel 10 to a setting screen 50B. Here, the setting screen 50B displayed in Step 26 is described with reference to FIG. 7. In FIG. 7, the setting screen 50B is the same as the setting screen 50 shown in FIG. 3 except for a portion. In the display of the rotation speed display region 51, the rotation speed 52 is "0" because the rotation of the rotor 5 is stopped. The running time 55 shown in the running time display region 54 remains "00:00", which is the same as in FIGS. 4 to 6. The current temperature 58 displayed in the temperature display region 57 remains 4.0° C. This is because in order to continue cooling an object to be centrifugally separated inside the rotation chamber 4, the cooling device 9 works until the open button 64 is operated and the door 7 is opened/closed.

As described above, the control device 8 displays the elapsed time 73 in addition to the content of the display screen 50A on the notification screen 70 immediately after the running is completed, and counts the elapsed time 73 up, and thus the user can reliably judge the running end state of the centrifuge 1, especially "whether the running is completed", from the display of the operation panel 10. In addition, because the elapsed time 73 is specifically displayed in the elapsed time display column 71, and the display of the elapsed time 73 is continued until the user performs some operation, particularly in a case of an object to be centrifugally separated (a sample) which is likely to be damaged, the necessity of centrifugally separating the sample again and the like can be easily judged.

Example 2

In the first example described above, the elapsed time from the end of the running of the centrifuge 1 is displayed on the operation panel 10. However, a configuration may also be used in which in addition to the display of the elapsed time from the end of the running on the operation panel 10, a communication part capable of communicating with an external mobile terminal is arranged in the centrifuge, and the control unit transmits the counted time to the external mobile terminal via the communication part and displays the counted time on the external mobile terminal. This second example is described with reference to FIGS. 8 to 10.

Figure 8:
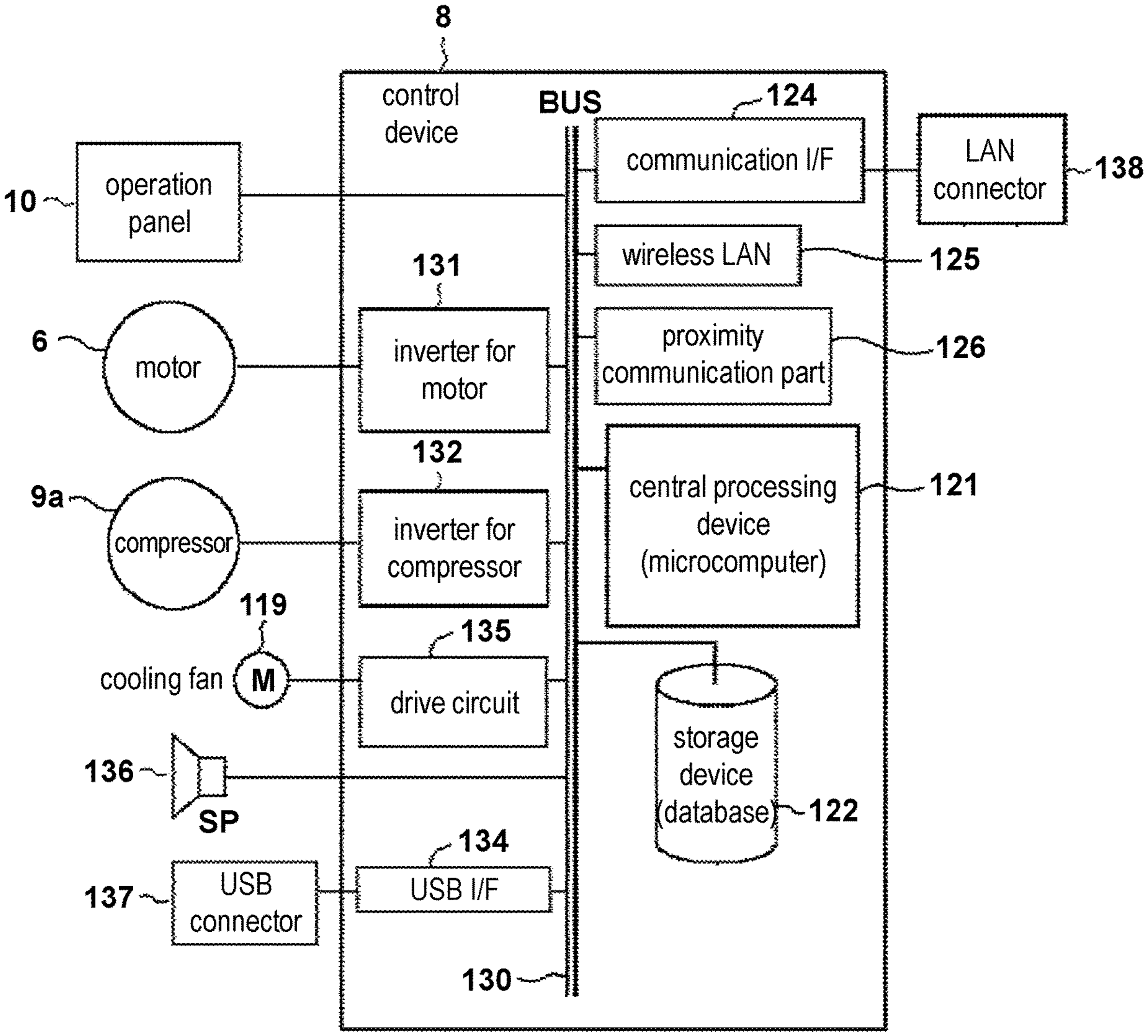
FIG. 8 is a schematic block diagram of a control device 8 in FIG. 1.

FIG. 8 is a schematic block diagram of the control device 8. A central processing device 121, a communication interface (I/F) 124, a wireless LAN 125, a proximity communication part 126 such as NFC or the like, a USB interface (I/F) 134, and a storage device 122 which are connected by a data bus (BUS) 130 are included inside the control device 8. The control device 8 further has an inverter for motor 131 for driving the motor 6, an inverter for compressor 132 for driving a compressor 9*a* of the cooling device, and a drive circuit 135 for driving a cooling fan 119 of the cooling device. The drive of these motors is controlled by the central processing device 121. The operation panel 10, a speaker 136, a LAN connector 138, and a USB connector 137 are further connected to the control device 8. In addition, a power supply device, an A/D converter, a D/A converter, and the like (not shown) are included inside the control device 8, but FIG. 8 shows only the main portion related to the present invention. The illustration and the description of other configurations are omitted.

The central processing device 121 is responsible for functions of generating running data of the centrifuge, storing the running data, and communicating with a mobile communication terminal 300, and the central processing device 121 is configured by including a microcomputer and the like. The storage device 122 is a device for storing control programs, setting condition data, running data, audit trail data, and the like of the centrifuge 1, and is configured by a hard disk device, a semiconductor storage device, and the like which are known. The operation panel 10 is an input/output part realized by a touch panel type liquid crystal display device, and functions as both an input part for the user to input the information and a display part for displaying the running data and various information to the user. The operation panel 10 is connected to the data bus 130. In the example, the touch panel type liquid display device is used as the operation panel 10, but it is not limited thereto, and the operation panel itself may be realized by a personal digital assistant (PDA) with a central processing device and the like.

The communication interface 124 is a circuit for communicating with an external device via a wired network line and for using a general communication method such as a known Ethernet (registered trademark) or the like, and can be connected to an external apparatus such as a router or the like by a known LAN connector 138. The wireless LAN 125 is a communication part for communicating with an external connection device in a wireless manner, is connected to the external mobile communication terminal 300 (for example, a smart phone or the like), and transmits/receives all or portion of the information displayed on the operation panel 10. The proximity communication part 26 is a known proximity communication part using Bluetooth (registered trademark), NFC (international standard for short-distance wireless communication), a Bluetooth low energy (BLE), or the like. By these configurations, the central processing device 121 of the centrifuge can directly communicate with the mobile communication terminal 300 such as a smart phone or the like, and can transmit and display a message indicating that the running is completed and the elapsed time from the centrifuge to the mobile communication terminal 300 as shown in FIG. 10.

Figure 9:
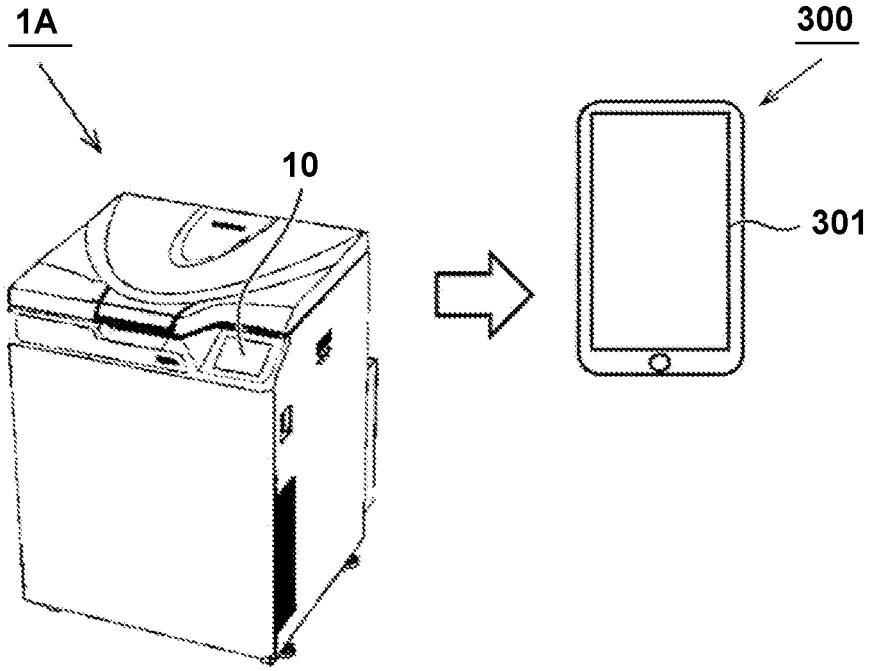
FIG. 9 is a diagram showing a state that information is transmitted from the centrifuge 1 to a mobile communication terminal 300.

FIG. 9 is a diagram showing a state in which the information is transmitted from a centrifuge 1A to the mobile communication terminal 300. The shape of a housing 2A in the centrifuge 1A is different from that of the housing 2 in the first example, and the mounting position of the operation panel 10 is also different, but other internal configurations are the same. Here, the control device 8 of the centrifuge 1A transmits necessary information to the mobile communication terminal 300 by using a communication part. Application software ("app") dedicated for receiving the information from the centrifuge 1A and displaying the information on a screen 301 is installed in advance, and thereby all or portion of the received information is displayed on the mobile communication terminal 300 side.

Figure 10:
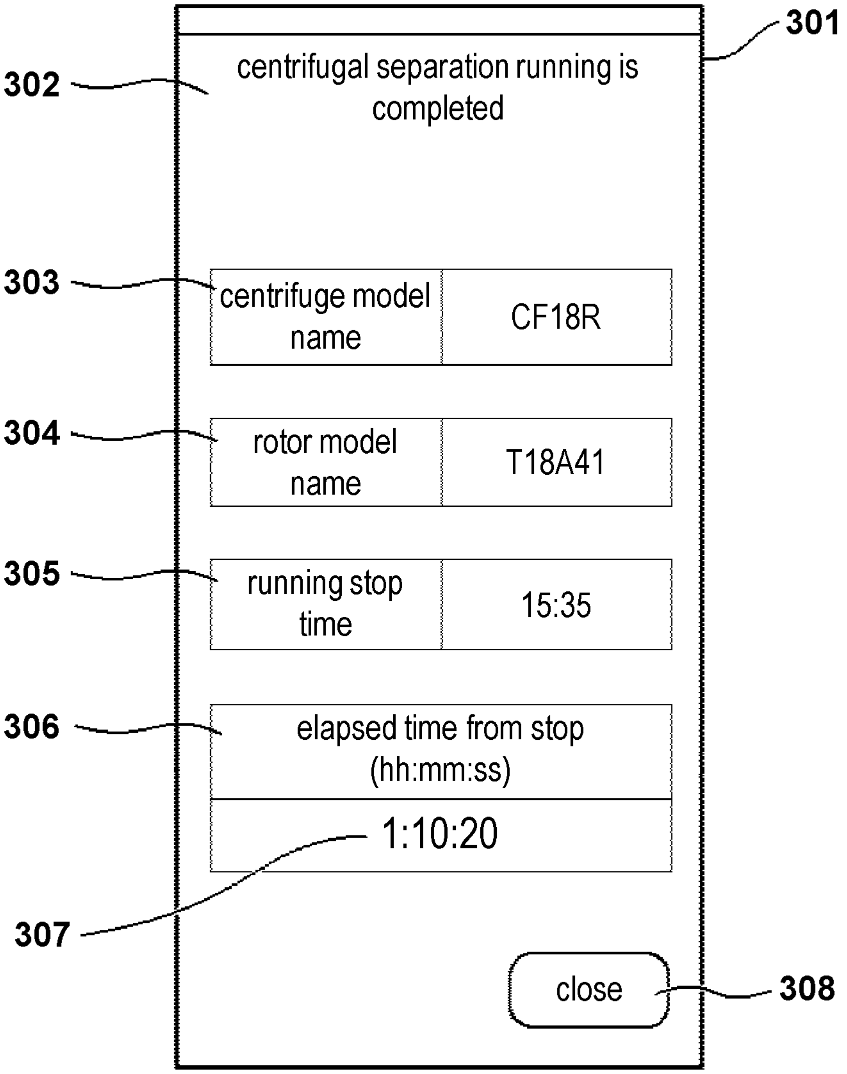
FIG. 10 is a diagram showing a display example of a screen 301 of the mobile communication terminal 300 in FIG. 9.

FIG. 10 is a diagram showing a display example of the screen 301 of the mobile communication terminal 300 in FIG. 9. The user who owns the mobile communication terminal 300 is not always near the centrifuge 1A, and may also be in a place where the centrifuge 1A cannot be visually recognized. Therefore, when the running of the centrifuge 1A is completed, the microcomputer included in the control device 8 of the centrifuge 1A transmits, to the mobile communication terminal 300, the information indicating that the running is completed, the model name of the centrifuge 1A, and the information shown in FIG. 3 and FIG. 6. The mobile communication terminal 300 extracts the information considered to be required from the received information and displays the information on the screen 301. FIG. 10 is a diagram showing an example thereof. On the screen 301, an end message 302 indicating that "the centrifugal separation running is completed" is displayed, and the required information, that is, a model name 303 (here, "CF18R") of the centrifuge 1A and a rotor model name 304 (here, "T18A41"), is displayed on a lower side of the end message 302. The reason is that the user cannot determine which centrifuge the message is for unless at least the model name 303 ("CF18R") of the centrifuge 1A among the information is displayed.

It should be noted that the display of the rotor model name 304 may be omitted, but the user is informed of the rotor model name 304 and thereby easily identifies the type of the sample container to be mounted, the content of the sample, and the like. A running stop time 305 is the time at which the message from the centrifuge 1A is received when the centrifuge running is completed. In the centrifuges 1 and 1A of the example, the centrifuge may not be equipped with a real-time clock, but the mobile communication terminal 300 is always equipped with a real-time clock. Therefore, when the mobile communication terminal 300 receives the information that an elapsed time 307 is started, which is received from the centrifuge 1A, the time of receiving the information may be displayed as the running stop time 305 of the centrifuge 1A.

In the elapsed time display column 306 from the stop, the same time as the elapsed time 73 on the notification screen 70 in FIG. 5 and FIG. 6 is displayed. This time is transmitted from the centrifuges 1 and 1A at a predetermined interval (for example, every one minute). Here, an example is shown in which the elapsed time 307 after the centrifugal separation running is completed is 1 hour, 10 minutes and 20 seconds. An icon 308 displayed as "close" is displayed in a lower right portion of screen 301. The owner of the mobile communication terminal 300 can close this screen and return to the original screen by touching the icon 308. In addition, the screen 301 in FIG. 10 can be redisplayed or the display history can be displayed by restarting the app which is once closed. It is preferable that the elapsed time 307 is updated and displayed according to a time point of redisplaying when the screen 301 is redisplayed.

The present invention is described above based on the examples, but the present invention is not limited to the above-described examples, and various modifications can be made without departing from the gist of the present invention. For example, the above-described examples are described in the case in which the operation panel 10 is the liquid crystal display having an input/output function, but the present invention can also be realized by a display mechanism using a push button, an input part such as a 4-direction switch, a dial, or the like, and a segment LED. When a segment LED is used, the same function can be achieved by slowly blinking the display column of the elapsed time and performing the counting-up.

What is claimed is:

1. A centrifuge, comprising:

a rotor;

a motor which drives the rotor to rotate;

an input/output part which allows a user to input a set running time of the rotor and a drive start instruction of the motor, and is capable of displaying a running state of the motor; and a control unit which starts drive of the motor when the drive start instruction is input to the input/output part and controls the drive of the motor, wherein the control unit stops the drive of the motor to stop the rotor after the set running time for centrifugal separation which is input by the input/output part, wherein the control unit starts counting of counted time after the rotor is stopped, and displays the counted time on the input/output part, wherein the control unit erases the display of the counted time performed by the input/output part when an operation of the input/output part by the user is detected during counting of the counted time.

2. The centrifuge according to claim 1, wherein the control unit stops counting of the counted time and capable of operating an unlock button of a locking mechanism when an operation of the input/output part by the user is detected during counting of the counted time.

3. The centrifuge according to claim 2, wherein the input/output part is a touch-type dot matrix display, which displays the set running time and a set rotation speed of the rotor and a set temperature of the rotor, and the control unit displays the counted time by adding the counted time to the content of the display or superimposing the counted time on a screen of the display.

4. The centrifuge according to claim 3, comprising a bowl which accommodates the rotor, wherein an upper opening unit of the bowl is closed by an openable door to form a rotor chamber, a cooling device which cools the bowl is arranged, and the control unit makes the cooling device work to maintain a temperature of the rotor chamber at the set temperature even in the middle of counting of the counted time and the display of the counted time on the input/output part.

5. The centrifuge according to claim 2, wherein the input/output part is a combination of a segment type display device and an operation input unit which makes the display content of the display device variable, a display column of the set running time of the rotor is arranged in the display device, and counting of the counted time after the elapse of the set running time is performed by counting up and displaying in the column of the set running time.

6. The centrifuge according to claim 2, wherein the control unit has a storage unit, and the control unit is capable of storing an end time point at which the motor is stopped in the storage unit, and displaying the end time point stored in the storage unit on the input/output part.

7. The centrifuge according to claim 1, wherein the input/output part is a touch-type dot matrix display, which displays the set running time and a set rotation speed of the rotor and a set temperature of the rotor, and the control unit displays the counted time by adding the counted time to the content of the display or superimposing the counted time on a screen of the display.

8. The centrifuge according to claim 7, comprising a bowl which accommodates the rotor, wherein an upper opening unit of the bowl is closed by an openable door to form a rotor chamber, a cooling device which cools the bowl is arranged, and the control unit makes the cooling device work to maintain a temperature of the rotor chamber at the set temperature even in the middle of counting of the counted time and the display of the counted time on the input/output part.

9. The centrifuge according to claim 7, wherein the control unit has a storage unit, and the control unit is capable of storing an end time point at which the motor is stopped in the storage unit, and displaying the end time point stored in the storage unit on the input/output part.

10. The centrifuge according to claim 1, wherein the input/output part is a combination of a segment type display device and an operation input unit which makes the display content of the display device variable, a display column of the set running time of the rotor is arranged in the display device, and counting of the counted time after the elapse of the set running time is performed by counting up and displaying in the column of the set running time.

11. The centrifuge according to claim 10, wherein the control unit has a storage unit, and the control unit is capable of storing an end time point at which the motor is stopped in the storage unit, and displaying the end time point stored in the storage unit on the input/output part.

12. The centrifuge according to claim 1, wherein the control unit has a storage unit, and the control unit is capable of storing an end time point at which the motor is stopped in the storage unit, and displaying the end time point stored in the storage unit on the input/output part.

13. The centrifuge according to claim 1, further comprising a communication part capable of communicating with a mobile terminal, wherein the control unit transmits the counted time to an external mobile terminal via the communication part and displays the counted time on the mobile terminal.

14. The centrifuge according to claim 1, comprising a rotor chamber which stores the rotor and has an opening for taking the rotor in/out, and a door which opens and closes the opening, wherein the control unit stops the display of the counted time on the input/output part when the door is opened.

* * * * *